United States Patent
Takanohashi

[19]

[11] Patent Number: 5,965,955
[45] Date of Patent: Oct. 12, 1999

[54] STEERING LOCKING DEVICE

[75] Inventor: Daisuke Takanohashi, Shizuoka-ken, Japan

[73] Assignee: Yazaki Corporation, Tokyo, Japan

[21] Appl. No.: 08/955,630

[22] Filed: Oct. 22, 1997

[30] Foreign Application Priority Data

Oct. 24, 1996 [JP] Japan .................................. 8-282460

[51] Int. Cl.$^6$ .................................................. B60R 25/02
[52] U.S. Cl. .................... 307/10.5; 307/10.3; 70/252; 180/287; 701/32; 701/36
[58] Field of Search ..................... 307/9.1–10.8; 70/57, 237, 245, 250, 251, 252, 255, 187; 180/287; 340/425.5, 426, 825.3, 825.31, 825.32, 825.34, 825.54, 825.69, 825.72; 701/1, 32, 36, 49

[56] References Cited

U.S. PATENT DOCUMENTS

| 3,708,032 | 1/1973 | Suzuki ..................... 180/287 |
| 4,250,976 | 2/1981 | Mochida ..................... 70/252 |
| 4,332,306 | 6/1982 | Turatti ..................... 180/287 |
| 4,487,042 | 12/1984 | Mochida et al. ..................... 70/252 |
| 4,638,882 | 1/1987 | Sato ..................... 180/287 |
| 4,756,174 | 7/1988 | Konii ..................... 70/252 |
| 4,945,740 | 8/1990 | Kawano et al. ..................... 70/521 |
| 4,982,584 | 1/1991 | Takeda et al. ..................... 70/252 |
| 5,343,077 | 8/1994 | Ysohida et al. ..................... 307/9.1 |

FOREIGN PATENT DOCUMENTS 63-71458  3/1988  Japan .

*Primary Examiner*—Albert W. Paladini
*Attorney, Agent, or Firm*—Finnegan, Henderson, Farabow, Garrett & Dunner, L.L.P.

[57] ABSTRACT

A locking bar may engage with an ignition switch which is switched to a START position and a LOCK position by a pushing operation, and may unlock a steering shaft when the ignition switch is at the START position and lock the steering shaft when the ignition switch is at the LOCK position. An ID code decision portion may decide whether or not an input identification number coincides with a registered identification number. A first actuator may unlock the ignition switch when the input identification number coincides with the registered identification number, and may lock the ignition switch when the input identification number does not coincide with the registered identification number. Accordingly, lock of the steering shaft due to failure or malfunction during running can be prevented.

6 Claims, 6 Drawing Sheets

STEERING LOCKING DEVICE

BACKGROUND OF THE INVENTION

The present invention relates to a steering locking device which is able to prevent lock of a steering shaft due to failure or malfunction caused during running of a vehicle.

In a steering locking device installed in a vehicle such as a car, an engine can be started by inserting a key into a cylinder lock and then rotating this cylinder lock by the key from a LOCK position to a START position sequentially.

In a recent steering locking device, an electric current is supplied to a motor incorporated into the steering locking device via an electronic button or a radio wave, then a rotor cam is moved reciprocally by rotation of the motor from the LOCK position to the START position, and then a locking bolt is shifted simultaneously with switching of an ignition switch in the same manner as a key operation.

After the engine is started, the rotor cam is returned from the START position to the ON position. At that time, in the event that the rotor cam is driven by the motor, a timing to return the rotor cam from the START position to the ON position becomes more important.

As an improved timing to return the above-mentioned rotor cam, a steering locking controller driven by a motor has been known, as set forth in Patent Application Publication (KOKAI) 63-71458, for example.

As shown in FIG.5, in this steering locking controller, a push button 111 is provided to a front central portion of a housing 109 and a motor driving unit 105 is provided on the back side of the push button 111.

As shown in FIG.6, when a password number is input into a control station module 102 via a plurality of push button switches 101, a motor driving device 105 is controlled by a microcomputer 104 including a CPU.

A motor (not shown) is driven by action of the motor driving device 105 to thus rotate a rotor cam (not shown). At that time, an ignition switch 108 is switched to the LOCK position, the ACC position, the ON position, and the START position sequentially with the rotation of this rotor cam.

A sound generating circuit 106 may inform the driver of respective rotating positions by sound every switching of respective positions. When the rotor cam is positioned at the ON position or the START position, the sound generating circuit 106 may instruct the driver of the vehicle by sound so as to push the push button 111 provided to the steering locking device.

When the driver pulls in his or her finger from the push button 111 at the same time when the engine is started, this push button 111 can be automatically restored by a spring force of a spring. At that time, a position of a contact point of the rotor cam is inverted to the ON position of the ignition switch 108 together with the motor.

However, in the steering locking device in the prior art, the steering shaft (not shown) is locked by a driving force of the motor, the solenoid, etc. when the ignition switch 108 is positioned at the LOCK position.

For instance, normally the ignition switch 108 is at the ON position when the car is running, nevertheless there may be some cases where the password number indicating this ON position is changed to another password number indicating the LOCK position due to noise, or the like.

In other words, these is a possibility that the steering shaft is locked because of failure or malfunction by the noise, etc. caused during running of the vehicle and a serious accident will be caused consequently.

SUMMARY OF THE INVENTION

It is an object of the present invention to provide a steering locking device capable of preventing lock of a steering shaft due to of failure or malfunction caused during running of a vehicle.

In order to overcome the above drawback, according to an aspect of the present invention, there is provided a steering locking device comprising an ignition switch which can be switched to at least a START position and a LOCK position when it is pushed; a shaft lock portion positioned to be engaged with the ignition switch, for unlocking a steering shaft when the ignition switch is set to the START position and locking the steering shaft when the ignition switch is set to the LOCK position; a decision portion for deciding whether or not an input identification number coincides with a registered identification number; and an identification lock portion for unlocking the ignition switch when the input identification number coincides with the registered identification number and locking the ignition switch when the input identification number does not coincide with the registered identification number.

According to the present invention, the decision portion may decide whether or not the input identification number coincides with the registered identification number, and the identification lock portion may unlock or release the ignition switch when the input identification number coincides with the registered identification number. For this reason, the engine can be started by setting the ignition switch to the START position by a pushing operation.

The shaft locking portion may lock the steering shaft when the ignition switch is set to the LOCK position. Therefore, once the unlocking signal is input into the identification lock portion for some reasons during running of the vehicle, no trouble is caused with respect to the steering shaft unless the ignition switch is not pushed. Accordingly, a possibility of direct lock of the steering shaft due to malfunction of the signal during running of the vehicle can be eliminated and driving safety of the vehicle can be assured and security of the vehicle can be improved.

In the preferred embodiment of the present invention, the steering locking device further comprises a selector lever for selecting at least a DRIVE range and a PARKING range; and a parking lock portion for unlocking the ignition switch when the PARKING range is selected by the selector lever and locking the ignition switch when the DRIVE range is selected by the selector lever.

According to this preferred embodiment of the present invention, the parking lock portion may unlock the ignition switch when the PARKING range is selected by the selector lever. That is to say, since the ignition switch cannot be pushed if the selector lever is not at the PARKING range, the ignition switch cannot be pushed down during running of the vehicle and therefore driving safety of the vehicle can be improved.

In the preferred embodiment of the present invention, the ignition switch includes a cam portion provided to the ignition switch so as to slide the shaft lock portion by a pushing operation, a first groove portion into which the identification lock portion is inserted when the ignition switch is locked, and a second groove portion into which the parking lock portion is inserted when the ignition switch is locked.

According to another aspect of the present invention, there is provided a steering locking device comprising an ignition switch which can be switched to at least a START position and a LOCK position when it is pushed; a shaft lock portion positioned to be engaged with the ignition switch, for unlocking a steering shaft when the ignition switch is set to the START position and locking the steering shaft when the ignition switch is set to the LOCK position; a selector lever for selecting at least a DRIVE range and a PARKING range; and a parking lock portion for unlocking the ignition switch when the PARKING range is selected by the selector lever and locking the ignition switch when the DRIVE range is selected by the selector lever.

DETAILED DESCRIPTION OF THE EMBODIMENT

A steering locking device according to an embodiment of the present invention will be explained with reference to accompanying drawings hereinafter.

Figure 1A:
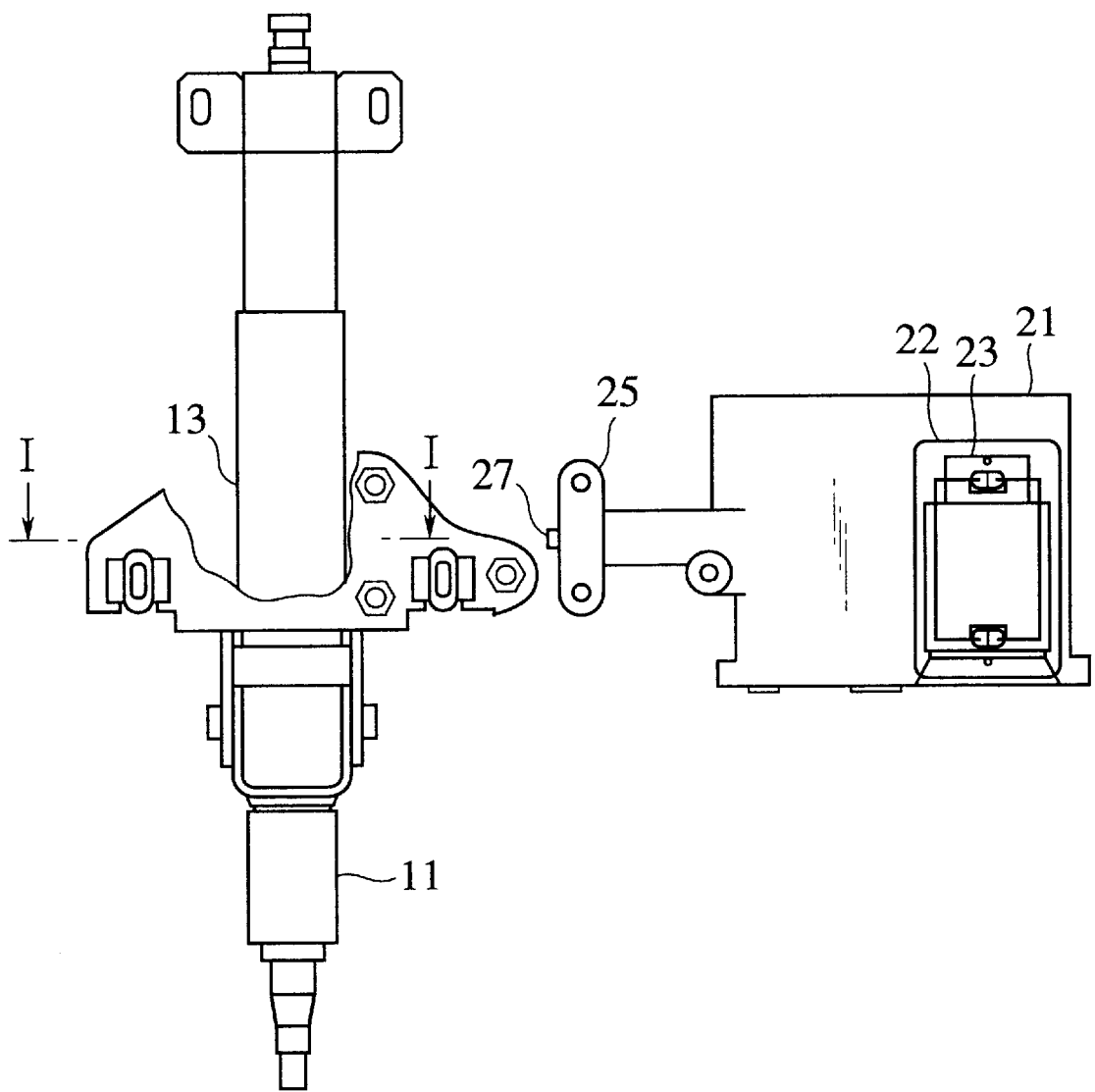
FIG. 1A is a view showing an external appearance of a steering locking device according to an embodiment of the present invention.
Figure 1B:
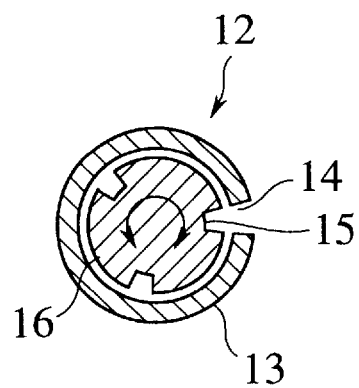
FIG. 1B is a sectional view showing a configuration of a locking portion of the steering locking device taken on line I—I of FIG. 1A.

FIG. 1A shows an external appearance of a steering locking device according to the embodiment of the present invention. As shown in FIG. 1A, a steering shaft 11 is composed of a substantial column body being extended along the vertical direction. To a part of this column body is provided a shaft lock 12 which is used to lock the steering shaft 11, as shown 14 sectional view of FIG. 1B.

This shaft lock 12 consists of a cylindrical body 13 which has a slot 14 thereon, and a column body 16 which has three grooves 15 thereon and is covered with the cylindrical body 13. A steering shaft 11 can be locked when a top end portion of a locking bar 27 is inserted into one of the grooves 15 via the slot 14 of the cylindrical body 13.

Figure 2:
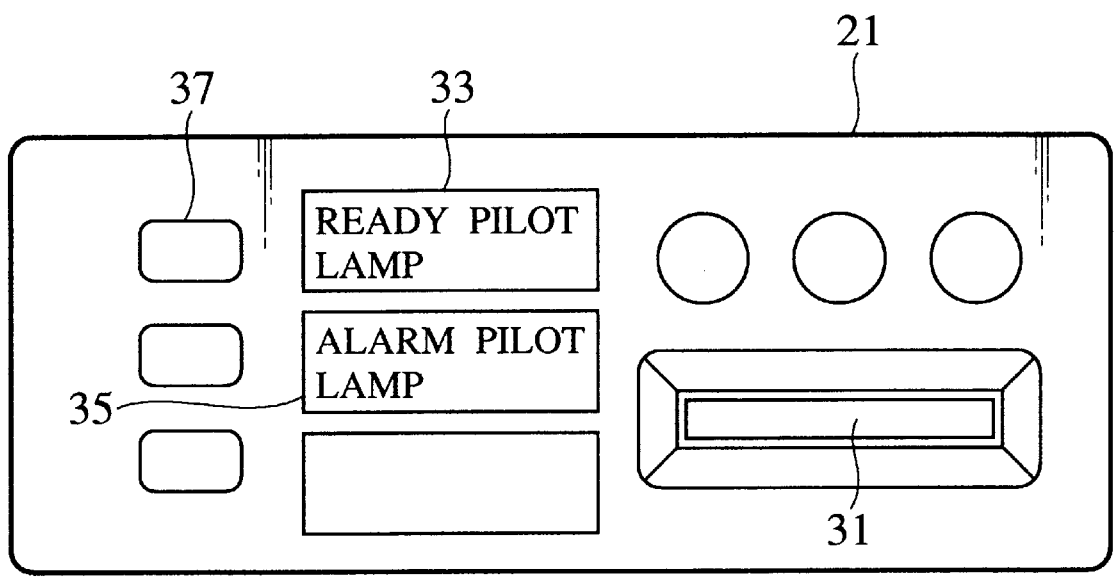
FIG. 2 is a front view showing a front panel of the steering locking device shown in FIG. 1A.

As shown in a front view of FIG. 2, an IC card insertion slot 31 into which an IC card for storing an identification code (referred simply to as "ID code" hereinafter) is inserted, a ready pilot lamp 33, an alarm pilot lamp 35, and an ignition switch 37 are provided on a steering locking device main body 21.

As shown in FIG. 1, the steering locking device main body 21 includes the IC card 23 when being inserted via the IC card insertion slot 31, an IC card recognition substrate 22 for recognizing the IC card 23, and a lever 25 attached to the looking bar 27.

Figure 3:
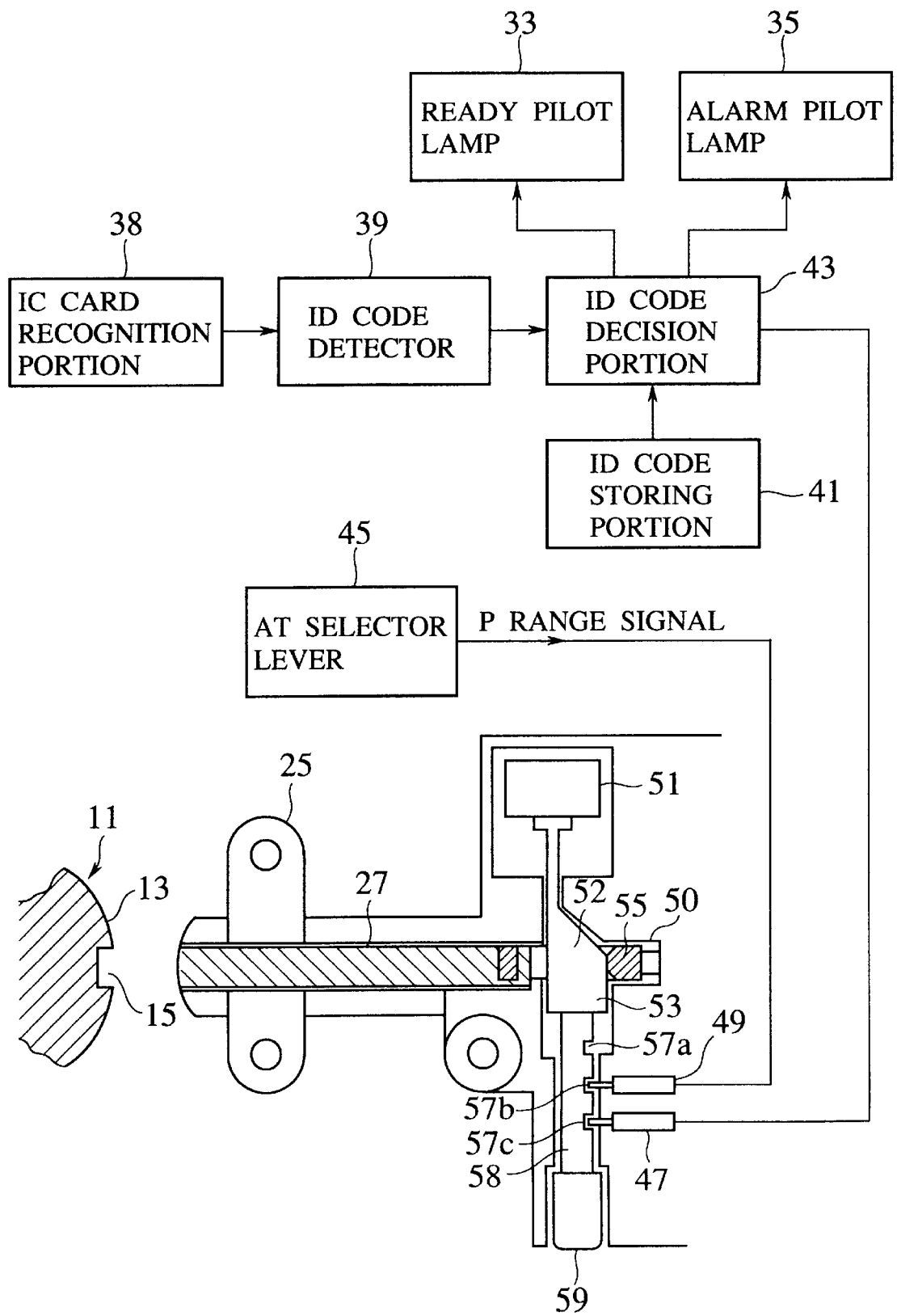
FIG. 3 is a view explaining an operation of the steering locking device at the time of starting an engine.

FIG. 3 shows an electric circuit and a mechanic portion for use in the steering locking device main body 21. In FIG. 3, an IC card recognition portion 38 may recognize the IC card which is inserted via the IC card insertion slot 31. The IC card recognition portion 38 is provided on the IC card recognition substrate 22.

An ID code detector 39 may detect an ID code which is assigned to the IC card 23 and stored therein. An ID code storing portion 41 may store a predetermined IC code in advance as a registered ID code. An ID code decision circuit 43 as a decision circuit may decide whether or not the input ID code detected by the ID code detector 39 coincides with the registered ID code in the ID code storing portion 41.

If the input ID code has coincided with the registered ID code, then the ID code decision circuit 43 decides that the IC card 23 is a regular card, and generates a command light the ready pilot lamp 33 and energize a first actuator 47 serving as an identification lock portion.

Conversely, unless the input ID code has coincided with the registered ID code, then the ID code decision circuit 43 generates a command light the alarm pilot lamp 35 and does not energize the first actuator 47.

An AT selector lever 45 can be switched to a PARKING setting, a DRIVE setting, etc. When the AT selector lever 45 is at the PARKING setting (referred simply to as a "P setting" hereinafter), a P setting signal is output from the AT selector lever 45 to a second actuator 49 serving as a parking locking mechanism and then the second actuator 49 is energized.

A contact point 51 of the ignition switch 37 consisting of a push lock switch is provided in the inside of a casing 50 of the steering locking device main body 21. A cam 53 having a slide taper surface 52 is connected to the contact point 51.

A longitudinal portion 58 on which grooves 57a to 57c are formed at equal distance is connected to the cam 53. A key top 59 which is a front surface portion of the ignition switch 37 to be pushed with the finger of the driver is connected to the longitudinal portion 58.

This key top 59 is held in its pushed state regardless of energization or deenergization of the first and second actuators 47, 49 when the engine is running.

A spring 55 is provided between the cam portion 53 and the casing 50. A top end portion of the locking bar 27 can be inserted into a groove 15 of the steering shaft 11 as a result of compression of the spring 55 which is caused by pushing the key top portion 59. The locking bar 27 and the spring 55 constitute a shaft lock portion.

Figure 4:
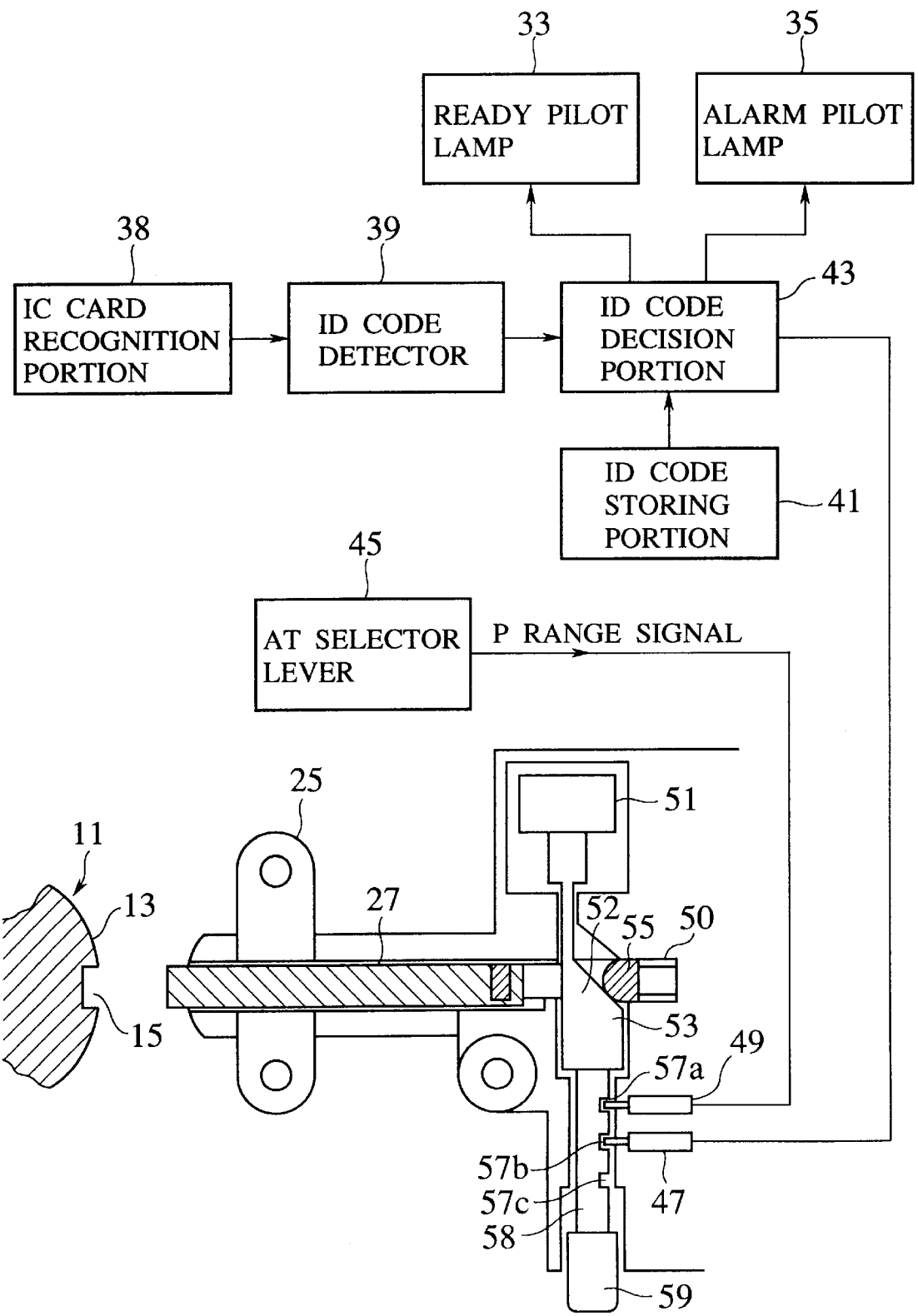
FIG.4 is a view explaining an operation of the steering locking device at the time of stopping the engine.
Figure 5:
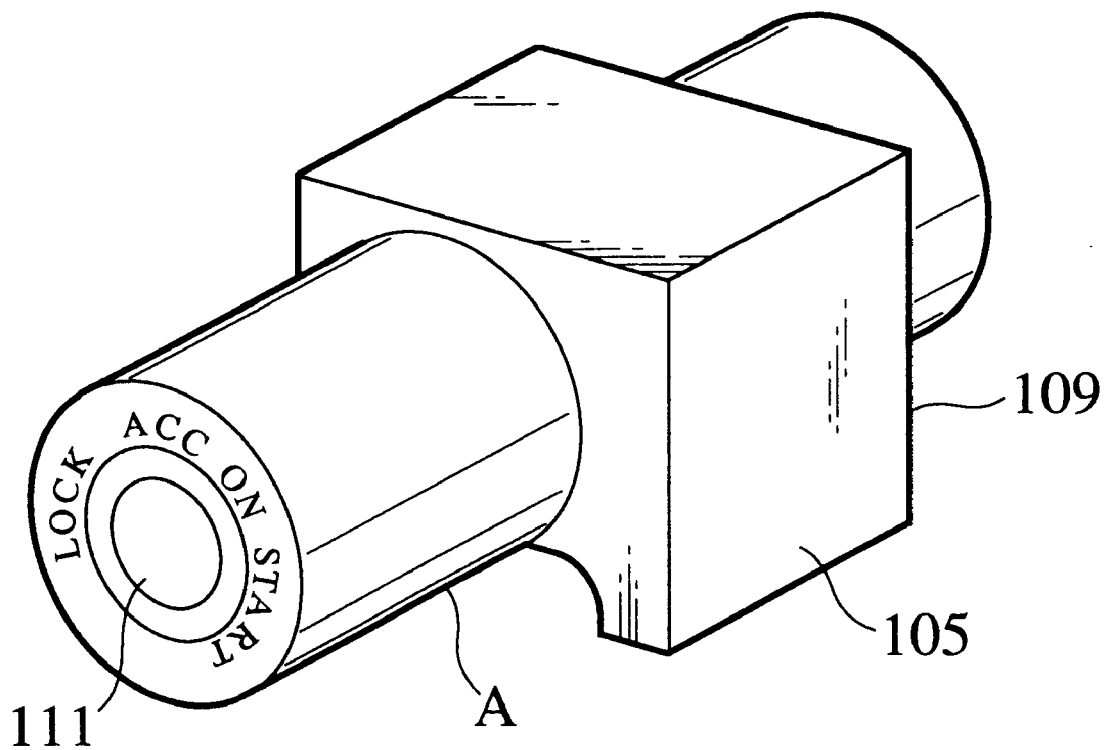
FIG.5 is a perspective view showing an example of an external appearance of a steering locking device in the prior art.
Figure 6:
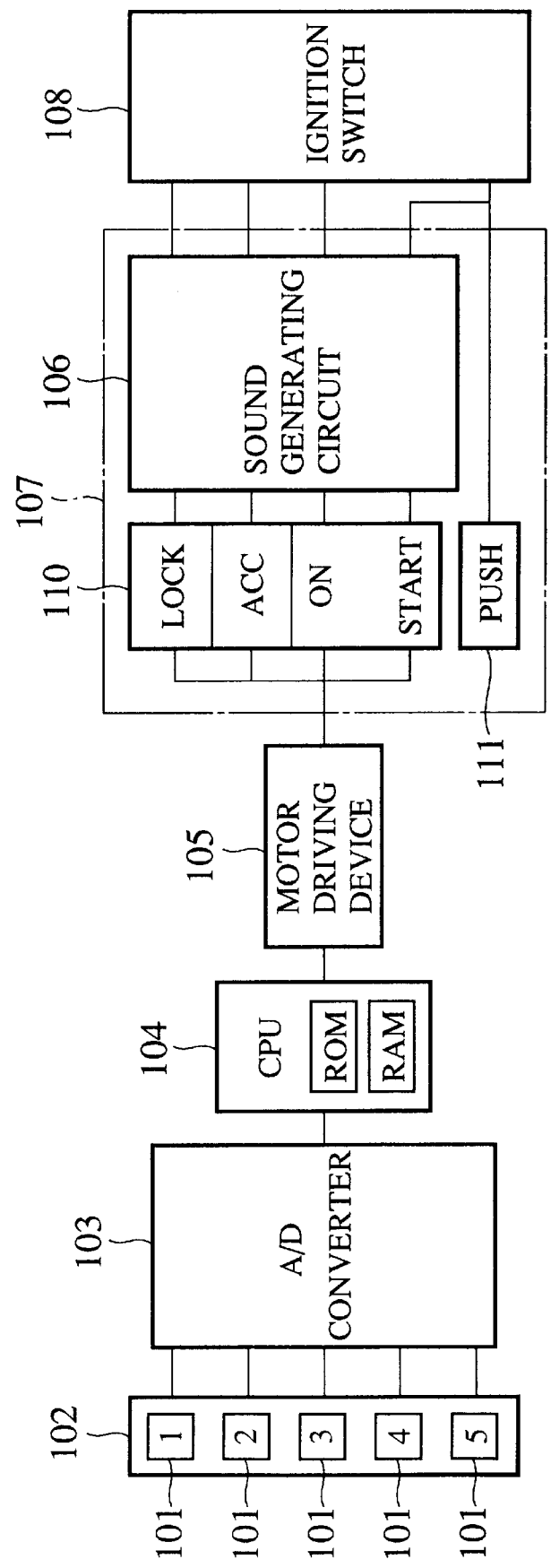
FIG. 6 is a block circuit diagram showing an electric circuit for use in the steering locking device in the prior art.

Next, an operation of the steering locking device constructed as above will be explained with reference to FIGS. 3 and 4.

At first, an operation executed when the engine is started will be explained with reference to FIG. 3 hereunder. When the IC card 22 is inserted into the IC card insertion slot 31 the IC card recognition portion 38 can recognize or check the inserted IC card 23.

If the ID code detector 39 can detect the ID code stored in the IC card 23, then the ID code decision circuit 43 decides whether or not the input ID code detected by the ID code detector 39 coincides with the registered ID cede in the ID code storing portion 41.

If the input ID code has coincided with the registered ID code, then the ID code decision circuit 43 determines that the inserted IC card 23 is a regular IC card, and generates a command to light the ready pilot lamp 33 and supplies an unlocking signal to the first actuator 47 to thus move its rod to the right in FIG. 3. Therefore, a top end portion of the rod of the first actuator 47 can be pulled out from the groove 57c.

Next, when a P setting signal is output from the AT selector lever 45 to the second actuator 49, a rod of the second actuator 49 is moved to the right. Therefore, a top end portion of the rod of the second actuator 49 can be pulled out from the groove 57b.

In other words, since lock of the ignition switch 37 can be released by the unlocking signal generated from card verification and the P setting signal, the key top portion 59 can be pushed inward (toward the top of the page in FIG. 3). As a result, the engine is ready starting.

Since the cam portion 53 can compress the spring 55 by pushing in the key top portion 59, the locking bar 27 can move to the right direction correspondingly. Therefore, the top end portion of the locking bar 27 is not inserted into the groove 15 of the steering shaft 11.

If both ID codes coincides with each other, the first actuator 47 and the second actuator 49 are held in their energized states.

Unless the input ID hope coincides with the registered ID code, the ID code recognition portion 43 may light the alarm pilot lamp 35 but does not energize the first actuator 47 to move the rod rightward. In other words, the top end portion of the first actuator 47 is still inserted into the groove 57c and therefore lock of the ignition switch 37 cannot be released.

Next, an operation executed when the steering shaft 11 is locked will be explained with reference to FIG. 4. Since the electric constituent elements have already been explained with reference to FIG. 3, their explanation will be omitted and therefore only an operation of mechanical constituent elements will be explained hereunder.

First, when the vehicle is stopped by decelerating the speed while running the motor, the ignition switch 37 is unlocked. Therefore, the key top portion 59 can be shifted outward by pushing in the key top portion 59 once again and then stopped.

The cam 53 is also shifted outward according to outward shift of the key top portion 59. Hence, the spring 55 can expand to come into contact with the slide taper surface 52 of the cam portion 53.

Since the locking bar 27 is shifted to the left (in FIG. 4) by an extension force of the spring 55, the top end portion of the locking bar 27 can be inserted into the groove 15 of the steering shaft 11. As a result, the steering shaft 11 can be locked.

In this manner, according to the steering locking device of the embodiment of the present invention, the IC card is employed instead of the key with regard to a security aspect and also the steering shaft 11 is not directly locked by the solenoid 47, etc. but the ignition switch 37 is locked.

Accordingly, even if the first actuator 47 or the second actuator 49 is restored to its original position (grooves 57c or 57b) due to noise, breaking of wire, etc., no trouble occurs in handling operation during running of the vehicle since the ignition switch 37 is still held at its unlocked position. In other words, the steering shaft 11 is not locked absolutely during running of the vehicle.

The steering shaft 11 is never locked unless the ignition switch 37 is set to the LOCK position. Therefore, even if an unlocking signal is input into the actuator during running of the vehicle for some reason, handling of the steering shaft 11 is by no means interrupted unless the ignition switch 37 is pushed.

Therefore, the possibility that the steering shaft is directly locked due to failure or malfunction of the steering locking device or the signal during running of the vehicle can be eliminated. In addition, security of the vehicle can be improved.

Unless the AT selector lever 45 is set to the P setting, the top end portion of the rod of the second actuator 49 is inserted into the groove 57b and thus the key top portion 59 cannot be pushed in. Hence, the ignition switch 37 cannot be pressed during running of the vehicle to thus assure the driving safety during running of the vehicle.

The present invention is not restricted to the above-mentioned embodiment. Both the first actuator 47 and the second actuator 49 have been employed in the embodiment, but only the first actuator 47 may be provided, for example. In this case, lock or unlock of the ignition switch 37 will be carried out only by ID card verification.

Alternatively, only the second actuator 49 may be provided, for instance. In this case, lock or unlock of the ignition switch 37 will be carried out only by input of the P setting signal

What is claimed is:

1. A steering locking device comprising:

an ignition switch which can be actuated between at least a START position and a LOCK position, a position of the switch changing when the ignition switch is pushed, the switch remaining at a set position until the switch is pushed;

a shaft lock mechanically linked to said ignition switch, for unlocking a steering shaft when said ignition switch is set to said START position and locking said steering shaft when said ignition switch is set to said LOCK position;

a decision circuit for comparing an input identification number to a registered identification number and generating a command; and an identification locking mechanism responsive to the command for unlocking said ignition switch when said input identification number coincides with said registered identification number, and locking said ignition switch when said input identification number does not coincide with said registered identification number.

2. A steering locking device according to claim 1, wherein the ignition switch retracts from the LOCK position to the START position.

3. A steering locking device according to claim 1, further comprising:

a selector lever for selecting at least a DRIVE setting and a PARKING setting; and a parking locking mechanism for unlocking said ignition switch when said PARKING setting is selected by said selector lever, and locking said ignition switch when said DRIVE setting is selected by said selector lever.

4. A steering locking device according to claim 3, wherein said ignition switch includes, a cam adapted to disengage said shaft lock from said steering shaft when said ignition switch is actuated from the LOCK position to the STEERING position, a first groove into which said identification lock is inserted when said ignition switch is locked, and a second groove into which said parking lock is inserted when said ignition switch is locked.

5. A steering locking device comprising:

an ignition switch which can be actuated between at least a START position and a LOCK position, a position of the switch changing when the ignition switch is pushed, the switch remaining at a set position until the switch is pushed;

a shaft lock mechanically linked to said ignition switch, for unlocking a steering shaft when said ignition switch is set to said START position and locking said steering shaft when said ignition switch is set to said LOCK position;

a selector lever for selecting at least a DRIVE setting and a PARKING setting; and a parking locking mechanism for unlocking said ignition switch when said PARKING setting is selected by said selector lever and locking said ignition switch when said DRIVE setting is selected by said selector lever.

6. A steering locking device according to claim 5, wherein the ignition switch retracts from the LOCK position to the START position.

* * * * *